(12) United States Patent
Hayashi

(10) Patent No.: US 6,913,252 B2
(45) Date of Patent: Jul. 5, 2005

(54) DAMPER DEVICE

(75) Inventor: Yoshitaka Hayashi, Kawagoe (JP)

(73) Assignee: Kabushiki Kaisha Strawberry Corporation, Saitama-ken (JP)

( * ) Notice: Subject to any disclaimer, the term of this patent is extended or adjusted under 35 U.S.C. 154(b) by 18 days.

(21) Appl. No.: 10/332,264

(22) PCT Filed: Jul. 30, 2001

(86) PCT No.: PCT/JP01/06527

§ 371 (c)(1),
(2), (4) Date: Jan. 7, 2003

(65) Prior Publication Data

US 2003/0141159 A1 Jul. 31, 2003

(30) Foreign Application Priority Data

Jul. 28, 2000 (JP) ........................................ 2000-228848

(51) Int. Cl.[7] ........................ B60G 13/00; B60G 15/00;
F16F 11/00; F16F 7/00; F16F 9/00
(52) U.S. Cl. ........................ 267/208; 267/201; 267/276; 188/381
(58) Field of Search ................................ 267/134, 196, 267/198, 201, 205, 207, 208, 214, 215, 273, 276, 281, 282, 284; 188/381; 16/54, 303, 304, 342; 4/240, 241, 248, 236, 246.2; 384/99

(56) References Cited

U.S. PATENT DOCUMENTS

| | | | | |
|---|---|---|---|---|
| 5,010,601 A | * | 4/1991 | Kobayashi et al. ............. 4/236 |
| 5,257,680 A | * | 11/1993 | Corcoran et al. ............. 188/129 |
| 5,276,945 A | * | 1/1994 | Matsumura .................... 16/337 |
| 5,388,281 A | * | 2/1995 | Wiklund et al. ................ 4/248 |
| 5,769,188 A | * | 6/1998 | Okabe et al. ............. 188/82.84 |
| 6,325,188 B1 | * | 12/2001 | Wu .............................. 188/381 |
| 6,389,611 B2 | * | 5/2002 | Fujita ............................. 4/236 |
| 6,421,842 B1 | * | 7/2002 | Fujita ............................. 4/236 |
| 6,464,052 B1 | * | 10/2002 | Hsiao .......................... 188/290 |
| 2001/0004776 A1 | * | 6/2001 | Fujita ............................. 4/236 |

FOREIGN PATENT DOCUMENTS

| | | | |
|---|---|---|---|
| JP | 3-265727 | | 11/1991 |
| JP | 450524 | * | 2/1992 |
| JP | 6-294 | | 1/1994 |
| JP | 6-193666 | | 7/1994 |
| JP | 7-705697 | | 6/1995 |
| JP | 2000356065 | * | 12/2000 |
| WO | WO 93/13333 | * | 7/1993 |

* cited by examiner

Primary Examiner—Jack W. Lavinder
Assistant Examiner—Devon Kramer
(74) Attorney, Agent, or Firm—Sughrue Mion, PLLC

(57) ABSTRACT

A damper device includes a shaft 2 inserted relatively rotatably into an axial hole 1a provided in a bearing portion 1. A high flexible resin portion 3 is provided between an outer circumferential surface of the shaft 2 and an inner surface of the axial hole 1a. A recess portion 4, with which the high flexible resin portion 3 contacts, and into which the high flexible resin portion 3 bites by relative rotation of the shaft 2 to the bearing portion 1, is provided in either one or both of the inner surface of the axial hole 1a and the outer circumferential surface of the shaft 2.

3 Claims, 6 Drawing Sheets

DAMPER DEVICE

TECHICAL FIELD

The present invention relates to a damper device.

BACKGROUND ART

In general, as a damper device for exhibiting a dampening function for reducing amplitude of vibration or sound or shock, a so-called air damper or an oil damper has been conventionally used.

However, the conventionally proposed damper device has a problem that, due to its structural feature, a precision (sealing) structure and high technology are required to prevent the leakage of fluid such as air or oil and accordingly, the mass productivity is worse, a very high cost is consumed and the maintenance is difficult to cause a high running cost.

The present applicant paid attention to the damper device and invented a novel damper device having an extremely high commercial value with a sales point.

DISCLOSURE OF THE INVENTION

There is provided a damper device characterized in that a shaft 2 inserted relatively rotatably into an axial hole 1a provided in a bearing portion 1 is provided, a high flexible resin portion 3 such as urethane or rubber is provided between an outer circumferential surface of the shaft 2 and the inner surface of said axial hole 1a in an intervening condition, a recess portion 4 into which said high flexible resin portion 3 bites by relative rotation of the shaft 2 to the bearing portion 1 is provided, the recess portion 4 is formed by forming a recess groove 5 in an axial direction in the outer circumferential surface of the shaft 2, and said high flexible resin portion 3 is constituted by a tubular soft member 6 provided with a suitable flexibility and the shaft 2 provided with the recess portion 4 is inserted relatively rotatably into the axial hole 1a of said bearing portion 1 in which the tubular soft member 6 being internally fitted whereby dampening effect due to the contact resistance between the shaft 2 and the tubular soft member 6 is generated when the shaft 2 is rotated relative to the bearing portion 1.

Also, the damper device as set forth in claim 1 is further characterized in that the dampening force may be adjusted by adjusting a bite-in degree of said high flexible resin portion 3 by designing a shape of said recess portion 4 whereby the dampening force generated when the shaft 2 and the bearing portion 1 are rotated relative to each other in one direction and the dampening force generated in the relative rotation in the other direction are differentiated from each other.

BEST MODE FOR EMBODYING THE INVENTION

Figure 1:
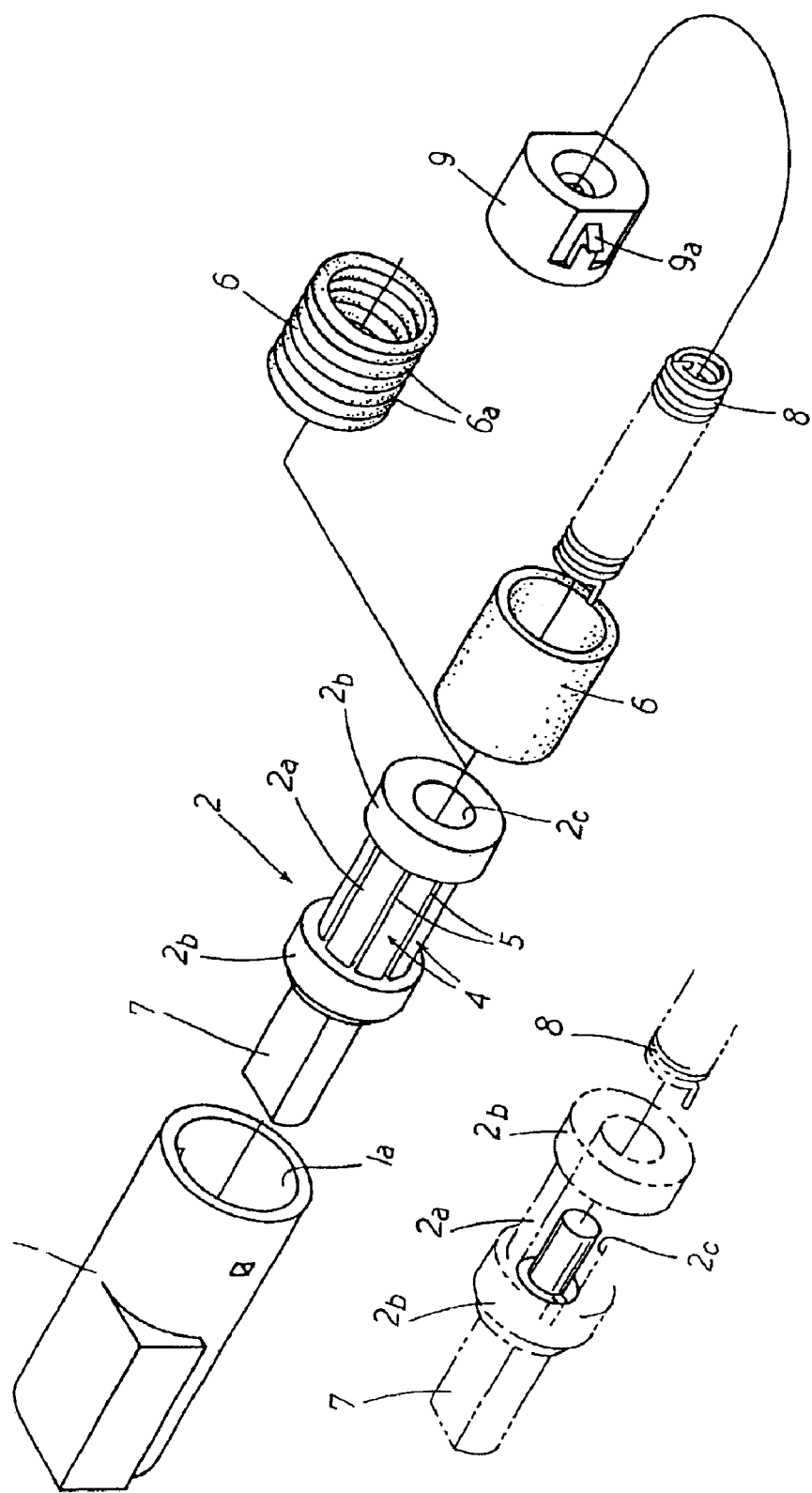
FIG. 1 is an exploded perspective view showing the present embodiment.

A possibly best mode of the embodiment of the present invention (how to embody the invention) will is described in brief while showing the resultant effect on the basis of the drawings.

In the damper device according to the present invention, when the shaft 2 and the bearing portion 1 are rotated relative to each other, the high flexible resin portion 3 provided between the outer circumferential surface of the shaft 2 and the inner surface of the axial hole 1a is brought into contact with the outer circumferential surface of the shaft 2, and bites into the recess portion 4 provided in the outer circumferential surface of the shaft 2. It is possible to obtain the dampening effect by the contact resistance generated in this case.

Accordingly, if the damper device is the device that may obtain the dampening effect from fluid such as air or oil as in the conventional device, as described above, there is a problem that the precision (sealing) structure and high technology are required, and accordingly, the mass productivity is worse and the cost is extremely high and in addition, the maintenance is difficult with the high running cost. However, according to this embodiment, as described above, the excellent dampening effect may be obtained by the contact resistance when each high flexible resin portion 3 bites into the recess portion provided in the circumferential surface of the shaft 2. The damper device has an extremely simple structure in comparison with the conventionally proposed damper device due to the structure that has not been proposed in the conventional device such as the structural members or the assembly constituting the damper device. Accordingly, the device according to this embodiment is superior in mass productivity and is less costly and even if the replacement and repair are needed, the running cost may be reduced because of the simple structure.

Since the recess portion 4 is formed into the recess groove 5 in the axial direction in the outer circumferential surface of the shaft 2, i.e., since the recess portion 4 is formed by the recess groove 5 formed in the direction perpendicular to the relative rotational direction between the shaft 2 and the bearing portion 1, unlike the structure where projections that may simply serve as the contact resistance are provided, the recess portion 4 would never serve against the relative rotation between the shaft 2 and the bearing portion 1 and would ensure the smooth relative rotation to obtain the structure that may exhibits the excellent dampening effect due to the bite-in of the high flexible resin portion 3 into the recess portion 4 without fail, and provided with the excellent performance as the damper device. In addition, the device is superior also in mass productivity and is less costly because the recess portion 4 may readily be formed.

Also, in the case where the arrangement as set forth in claim 2, it is possible to set up the dampening force with ease. Namely, in the case where the conventionally proposed damper device is used, various fine adjustments for the dampening force with respect to various aspects such as specific weights of air or oil or a size of the device per se are needed so that high precision technology is needed. However, according to this embodiment, the bite-in degree of the high flexible resin portion 3 into the recess portion 4 is adjusted by the set-up of the shape of the recess portion 4 so that the dampening force may readily be adjusted and in addition the dampening force generated upon the relative rotation of the shaft 2 and the bearing portion 1 in one direction and the dampening force generated upon the relative e rotation in the other direction is differentiated from each other whereby the invention may be applied suitably for the structure in which, for example, the strong dampening force is needed in one direction and the strong dampening force is not needed in the other direction. Simply the set-up of the shape of the recess portion 4 are performed to thereby make it possible to obtain the desired dampening force with ease and without fail.

The drawings show one embodiment of the present invention that will now be described.

In the present embodiment, a damper device is constructed so that a shaft 2 inserted relatively rotatably into an axial hole 1a provided in a bearing portion 1 is provided, a high flexible resin portion 3 such as urethane or rubber is provided in the inner surface of said axial hole 1a, and a recess portion 4 with which the high flexible resin portion 3 contacts and into which said high flexible resin portion 3 bites by relative rotation of the shaft 2 to the bearing portion 1 is provided in the outer circumferential surface of the shaft 2 whereby dampening effect may be generated by the contact resistance when the shaft 2 and the bearing portion 1 are rotated relative to each other. Incidentally, the "relative rotation" in the present embodiment means the rotation of the bearing portion 1 to the shaft 2 and the rotation of the shaft 2 to the bearing portion 1.

Each portion of the present embodiment will now be described in detail.

Figure 2:
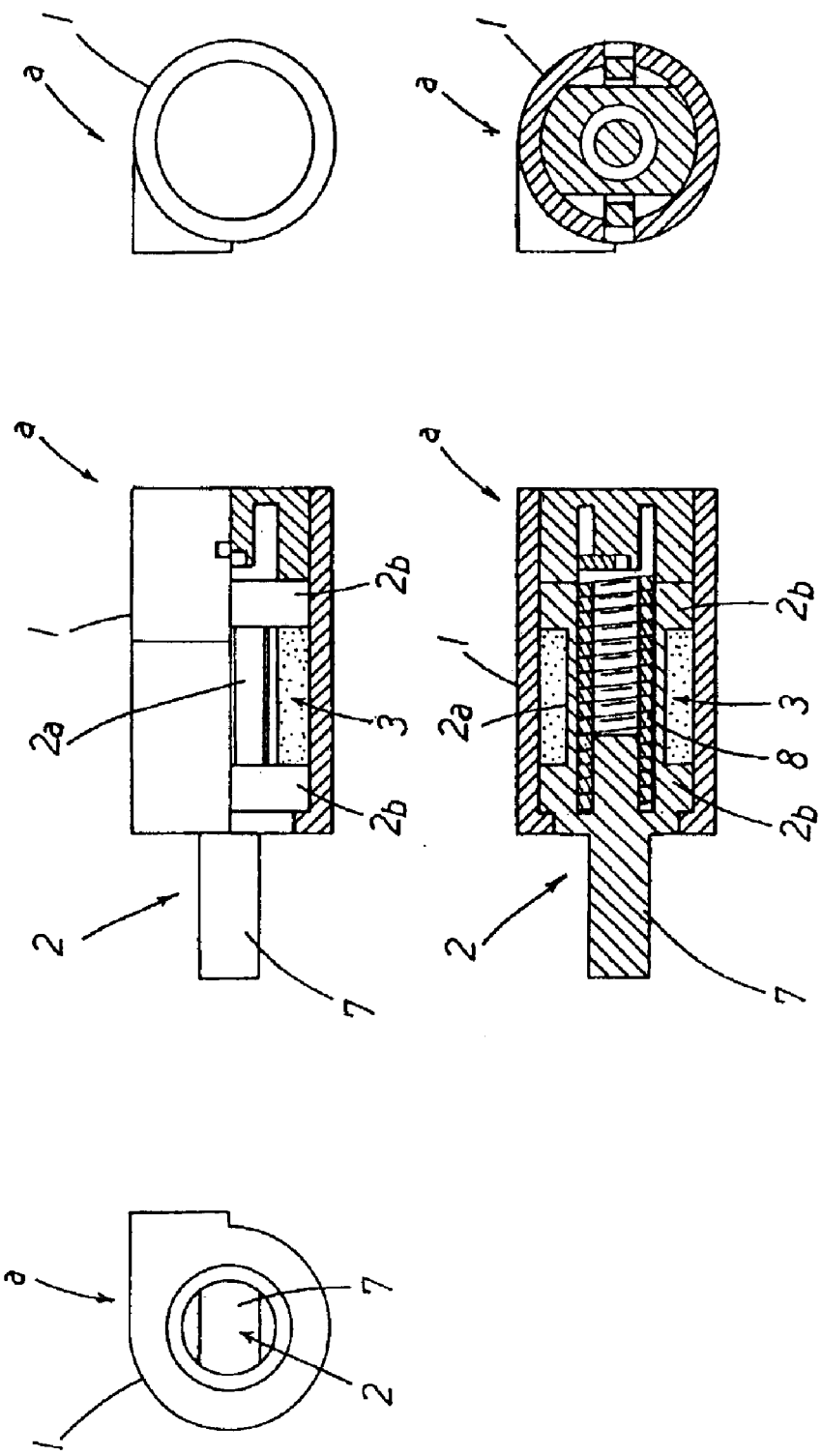
FIG. 2 is an illustration of the present embodiment.

As shown in FIGS. 1 and 2, a bearing portion 1 is formed of a member made of suitable synthetic resin into a tubular form. An axial hole 1a into which a shaft 2 to be described later will be inserted is provided in this bearing portion 1.

A diameter of this axial hole 1a is suitably designed so as to generate a predetermined dampening effect to a contact portion with an outer circumferential surface of the shaft 2 when the shaft 2 is fitted and the shaft 2 is rotated relative to the axial hole 1.

As shown in FIGS. 1 and 2, the shaft 2 is formed of the member made of suitable synthetic resin into the tubular shape and a rod portion 7 is formed to project from one end thereof.

A cross-section of this rod portion 7 is formed into a substantially rectangular shape. This rod portion 7 is formed as a joint portion for coupling the damper device a according to this embodiment with a mounted portion 13 where the dampening effect is exhibited in a rotation-preventing manner.

Also, a small diameter portion 2a is formed in a central portion of the shaft 2. The small diameter portion 2a is fitted and attached to a tubular soft member 6 as a high flexible resin portion 3 to be described later. The small diameter portion 2a is formed to be fit, in a pull-apart preventing manner, by large diameter portions 2b on the right and left sides of the small diameter portion 2a when the tubular soft member 6 is fitted therearound.

Also, the shaft 2 is provided with a plurality of recess portions 4 around its outer circumferential surface.

The recess portions 4 are provided with a plurality of axially e recess grooves 5 at a predetermined interval on its outer circumferential surface. Each recess groove 5 is formed for generating the dampening effect by the contact resistance while the high flexible resin portion 3 fitted around the small diameter portion 2a is put thereinto when the shaft 2 and the bearing portion 1 are rotated relative to each other.

Also, the shaft 2 is formed so that the bite-in degree of the high flexible resin portion 3 is adjusted by designing the shape of each recess portion 4 for adjusting the dampening force. In this embodiment, the dampening force generated when the shaft 2 and the bearing portion 1 are rotated relative to each other in one direction and the dampening force generated when the components are rotated in the other direction are different from each other.

Figure 3:
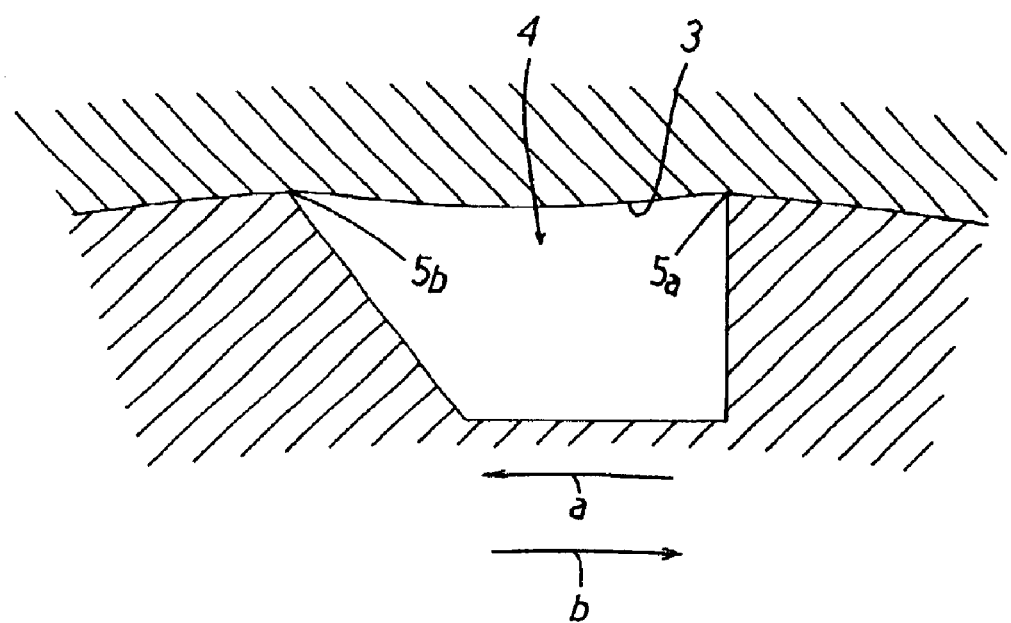
FIG. 3 is a cross-sectional view showing a primary portion related to the present embodiment.

More specifically, as shown in FIG. 3, one 5a of corner portions forming an opening edge of each recess portion 4 is formed into a right angle shape and the other 5b is formed into an obtuse angle shape. This is a structure for changing the abutment (hook) of the high flexible resin portion 3 biting into the recess portion 4. The shaft 2 is rotated in one direction (a direction indicated by a in FIG. 3) so that the right angle corner portion 5a of the recess portion 4 is brought into abutment with the high flexible resin portion 3 to thereby increase the contact resistance so as to obtain the strong dampening force. On the other hand, the shaft 2 is rotated in the other direction (a direction indicated by b in FIG. 3) so that the obtuse corner portion 5b of the recess portion 4 is brought into contact with the high flexible resin portion 3 to thereby decrease the contact resistance so as to obtain the dampening force weaker than the dampening force in the case where the shaft 2 is rotated in the direction indicated by a in FIG. 3.

Namely, the shape of the recess portion 4 is formed into an acute angle shape in addition to the dampening effect due to the contact resistance between the inner surface of the high flexible portion 3 and the outer circumferential surface of the shaft 2 to thereby generate the strong dampening force. On the other hand, the corner portion is formed into the obtuse angle (or a gentle curved surface) to thereby make it possible to generate the small dampening force.

Figure 5:
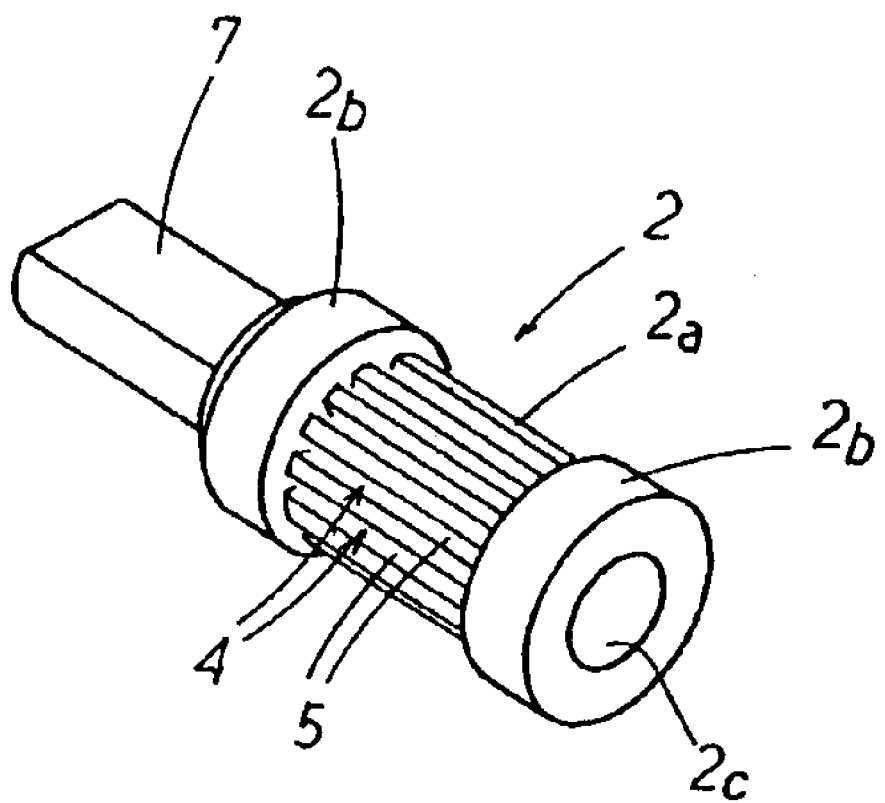
FIG. 5 is a perspective view showing another type of a shaft related to the present embodiment.

Also, it is possible to use a type in which, as shown in FIG. 5, fine recess portions 4 (recess grooves 5) are formed in the outer circumferential surface (small diameter portion 2a of the shaft 2) like a gear wheel. According to this, it is confirmed that the effect of the damper (the relationship between rotational velocity and the torque) is enhanced.

As shown in FIGS. 1 and 2, the high flexible resin portion 3 is formed of the tubular soft member 6 provided with a suitable flexibility such as urethane or rubber and is designed so as to be fitted or mounted in the small diameter portion 2a of the shaft 2 described above.

As shown in FIG. 1, this tubular soft member 6 is formed of a single tubular member. A length and a hardness of this tubular member 6 are changed suitably whereby the contact resistance (the bite-in degree) is changed to thereby make it possible to change dampening force.

Also, as the tubular soft member 6, it is possible to form the tubular soft member by combining a plurality of ring members 6a in addition to the case where the tubular soft member is formed of a single tubular member. According to this type, only the number of the ring members 6a is changed to change the contact resistance to thereby obtain the desired dampening force. (Incidentally, it is confirmed that the higher dampening force of this type tubular soft member 6 may be obtained as the rotational velocity needed for the damper.)

The thus constructed damper device a is assembled by fitting the shaft 2 into the axial hole 1a of the bearing portion 1. In this embodiment, the shaft 2 is provided with the return biasing function.

More specifically, as shown in FIGS. 1 and 2, a spring (torsion spring) 8 is inserted into a hole 2c of the shaft 2 when the shaft 2 is coupled with the bearing portion 1. One end of this spring 8 is fixed in the rotation-preventing manner, whereas the other end is fixed to a stationary member 9 inserted into the axial hole 1a of the bearing portion 1 and fixed and retained to a retainer portion 9a in the rotation-preventing manner.

Accordingly, the shaft 2 is rotated freely against the biasing force of the spring 8 within the bearing portion 1. When the shaft 2 is rotated in one direction (the direction indicated by a in FIG. 4) against the bearing portion 1, the shaft 2 is rotated against the biasing force of the spring 8. Thereafter, the shaft 2 is returned back biased and rotated in the other direction (the direction indicated by b in FIG. 4) against the bearing portion 1 by the return biasing force of the spring 8.

Figure 4:
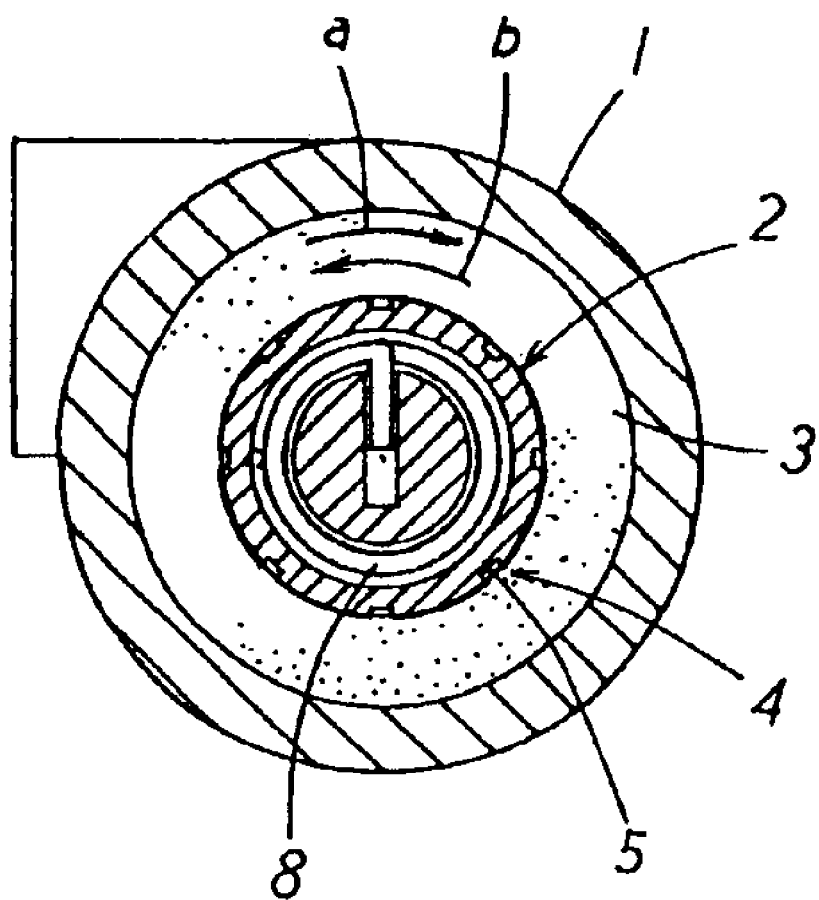
FIG. 4 is a cross-sectional view showing the present embodiment.

Then, in this embodiment, the shape of the recess portion 4, the material of the high flexible resin portion 3 and the like is suitably selected so that the dampening effect is generated due to the strong contact resistance between the shaft 2 and the high flexible resin portion 3 when this shaft 2 is rotated in one direction (the direction indicated by a in FIG. 4) of this shaft 2, whereas the weak dampening force is generated between the shaft 2 and the high flexible resin portion 3 when the shaft 2 is rotated in the other direction (the direction indicated by b in FIG. 4). Furthermore, in this embodiment, the dampening effect may be obtained simultaneously (in the double effect) due to the contact resistance between the bearing portion 1 and the high flexible resin 3 in addition to the dampening effect due to the contact resistance between the shaft 2 and the high flexible resin portion 3. The dampening force between this bearing portion 1 and the high flexible resin portion 3 is set so that the dampening force between the shaft 2 and the high flexible resin portion 3 is also increased and the dampening force between the high flexible resin portion 3 and the shaft 2 is exhibited with priority when the shaft 2 and the bearing portion 1 are rotated relative to each other.

Figure 6:
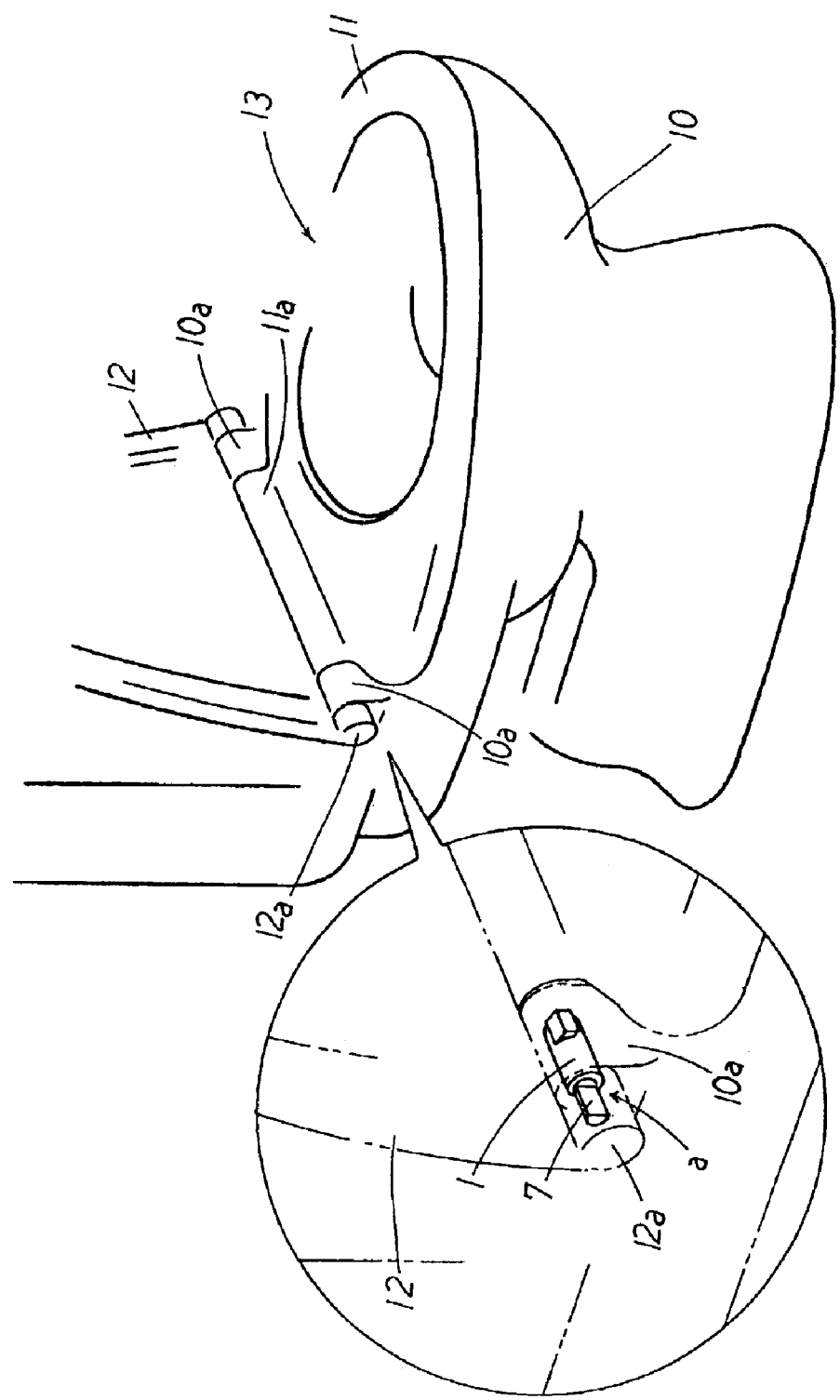
FIG. 6 is an illustration of a use condition of the present embodiment.

As a specific method of use of the thus constructed damper device a (the case of use), for example, as shown in FIG. 6, the damper device is mounted on an opening/closing cover 12 and a toilet seat 11 mounted hingeably on a western style toilet as a mounted member 13 to which the dampening effect imparts.

Namely, the damper device a is arranged for each a pivot portion between the opening/closing cover 12 and the toilet 10 on the central side of FIG. 6 and a pivot portion between the toilet seat 11 and the toilet 10 on the right side of FIG. 6. The shaft 2 (shaft rod portion 7) is fixed to a predetermined portion (pivot portions 11a and 12a) of the toilet seat 11 and the opening/closing cover 12. On the other hand, the bearing portion 1 is fixed to the mounting portion 10a of the toilet 10. Under this condition, when the toilet seat 11 and the opening/closing cover 12 is tilted from the upright condition, the outer circumferential surface of the shaft 2 (small diameter portion 2a) is rotated while generating the damping effect due to the contact resistance with the inner surface of the high flexible resin portion 3 (tubular soft member 6) (in this case, the shaft 2 is rotated against the bias of the spring 8), the excellent dampening effect is exhibited, whereby the toilet seat 11 and the opening/closing cover 12 would not be closed strongly but the excellent damper effect may be ensured with these components closed gradually. Thereafter, when the toilet seat 11 and the opening/closing cover 12 are opened, respectively, the return biasing force of the spring 8 works, so that the toilet seat 11 and the opening/closing cover 12 is easily opened with a light force.

Incidentally, the damper device a according to this embodiment is applied to the toilet seat 11 of the toilet and the opening/closing cover 12 thereof as the mounted member 13 to which the dampening effect is needed. The scope to which the invention may be applied is expanded if the characteristics of this embodiment may be sufficiently exhibited.

Accordingly, if the damper device is the device that may obtain the dampening effect from fluid such as air or oil as in the conventional device, as described above, there is a problem that the precision (sealing) structure and high technology are required, and accordingly, the mass productivity is worse and the cost is extremely high and in addition, the maintenance is difficult with the high running cost. According to this embodiment, as described above, the excellent dampening effect may be obtained by the contact resistance when each high flexible resin portion 3 bites into the recess portion 4 provided in the outer circumferential surface of the shaft 2. The damper device has an extremely simple structure in comparison with the conventionally proposed damper device due to the structure that has not been proposed in the conventional device such as the structural members or the assembly constituting the damper device. Accordingly, the device according to this embodiment is superior in mass productivity and is less costly and even if the replacement and repair are needed, the running cost may be reduced because of the simple structure.

Also, in this embodiment, since the recess portion 4 is formed into the recess groove 5 in the axial direction in the outer circumferential surface, i.e., since the recess portion 4 is formed by the recess groove 5 formed in the direction perpendicular to the relative rotational direction between the shaft 2 and the bearing portion 1, unlike the structure where projections that may simply serve as the contact resistance are provided, the recess portion 4 would never serve against the relative rotation between the shaft 2 and the bearing portion 1 and would ensure the smooth relative rotation to obtain the structure that may exhibits the excellent dampening effect due to the bite-in of the high flexible resin portion 3 into the recess portion 4 without fail, and provided with the excellent performance as the damper device. In addition, the device is superior also in mass productivity and is less costly because the recess portion 4 may readily be formed.

Also, according to this embodiment, it is possible to set up the dampening force with ease. Namely, in the case where the conventionally proposed damper device is used, various fine adjustments for the dampening force with respect to various aspects such as specific weights of air or oil or a size of the device per se are needed so that high precision technology is needed. However, according to this embodiment, the bite-in degree of the high flexible resin portion 3 into the recess portion 4 is adjusted by the set-up of the hardness of the high flexible resin portion 3 and the set-up of the shape of the recess portion 4 so that the dampening force may readily be adjusted and in addition the dampening force generated upon the relative rotation of the shaft 2 and the bearing portion 1 in one direction and the dampening force generated upon the relative rotation in the other direction is differentiated from each other whereby the invention may be applied suitably for the structure in which, for example, the strong dampening force is needed in one direction and the strong dampening force is not needed in the other direction. Simply the set-up of the shape of the recess portion 4 and the set-up of the hardness of the high flexible resin portion 3 are performed to thereby make it possible to obtain the desired dampening force with ease and without fail.

Also, in this embodiment, the dampening effect due to the contact resistance between the bearing portion 1 and the tubular soft member 6 may be obtained simultaneously (in the double effect) in addition to the dampening effect due to the contact resistance between the tubular soft member 6 as the high flexible resin portion 3 and the shaft 2 to thereby obtain the excellent dampening effect due to the structure that has not been proposed conventionally.

INDUSTRIAL APPLICABILITY

With the above-described structure according to the present invention, the excellent dampening effect may be obtained when each high flexible resin portion bites into the recess portion provided in either one or both of the axial hole and the shaft. The damper device has an extremely simple structure in comparison with the conventionally proposed damper device due to the structure that has not been proposed in the conventional device such as the structural members or the assembly constituting the damper device. Accordingly, it is possible to provide the novel damper device with a high commercial value, which is superior in mass productivity and is less costly and even if the replacement and repair are needed, the running cost may be reduced because of the simple structure.

Also, since the recess portion is formed by the recess groove formed in the direction perpendicular to the relative rotational direction of the shaft and the bearing portion, unlike the structure in which the projection is provided simply to serve as the contact resistance, without any hindrance against the relative rotation between the shaft and the bearing portion, it is possible to obtain a structure that exhibits the excellent dampening function while biting the high flexible resin portion into the recess portion without fail and making it possible to perform the smooth relative rotation, it is possible to provide the excellent performance for the damper device, and in addition, it is possible to provide the novel damper device that has such an extremely high commercial value that the formation of the recess is easy and less costly with a high mass productivity.

Also, according to the invention set forth in claim 2, in addition to the resultant effect of the invention as set forth above, the bite-in degree of the high flexible resin portion to the recess portion is adjusted by designing the shape of the recess portion to thereby make it possible to adjust the dampening force with ease, in addition, the dampening force generated when the shaft and the bearing portion are rotated relative to each other in one direction and the dampening force generated in the relative rotation in the other direction are differentiated from each other whereby the device may be suitably used for, for example, the opening/closing structure that needs the strong dampening force in one direction but does not need the strong dampening force in the other direction, and it is possible to provide the novel damper device that has such a extremely high commercial value that the desired dampening force may be obtained with ease and without fail only by designing the shape of the recess portion 4.

What is claimed is:

1. A damper device comprising:

a bearing portion with an axial hole;

a shaft inserted relatively rotatably into said axial hole, said shaft having two large diameter portions and; a small diameter portion located in an axial direction of said shaft between two large diameter portions;

a flexible resin portion provided between an outer circumferential surface of said shaft and an inner surface of said axial hole, said flexible resin portion fitted onto and contacting said small diameter portion of said shaft and positioned between said large diameter portions of said shaft; and a recess groove provided in said small diameter portion of said shaft, said recess groove extending along the axial direction in said outer circumferential surface of said shaft, wherein, upon relative rotation between said shaft and said bearing portion, said flexible resin portion bites into said recess groove, whereby dampening effect due to contact resistance between said shaft and flexible resin portion is generated.

2. The damper device as set forth in claim 1, wherein said recess groove is shaped, such that a dampening force generated when said shaft and said bearing portion are rotated relative to each other in one direction is different than a dampening force generated when said shaft and said bearing portion are rotated relative to each other in the other direction.

3. The damper device as set forth in claim 2, wherein said recess groove includes a first corner portion having a right angle and a second corner portion having an obtuse angle.

* * * * *